Sept. 6, 1938.  R. E. COX  2,128,916
AUTOMOTIVE CONTROL SYSTEM
Filed Feb. 9, 1938  3 Sheets-Sheet 1
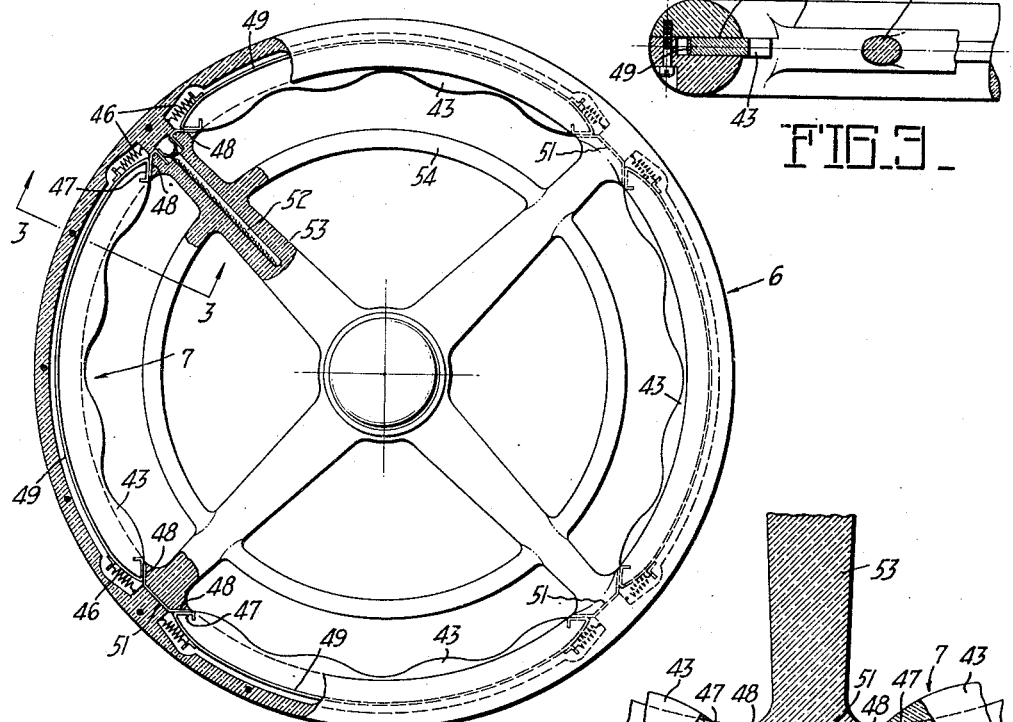
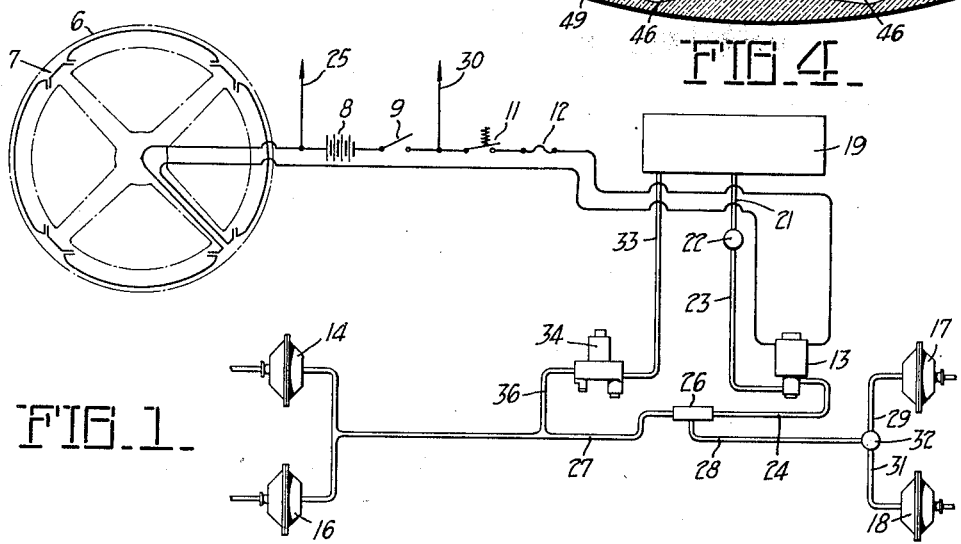
INVENTOR.
Raymond E. Cox
BY Joseph B. Gardner
ATTORNEY.

Sept. 6, 1938.       R. E. COX       2,128,916
AUTOMOTIVE CONTROL SYSTEM
Filed Feb. 9, 1938       3 Sheets-Sheet 2

INVENTOR.
Raymond E. Cox.
BY Joseph B. Gardner
ATTORNEY.

Sept. 6, 1938.    R. E. COX    2,128,916
AUTOMOTIVE CONTROL SYSTEM
Filed Feb. 9, 1938    3 Sheets-Sheet 3
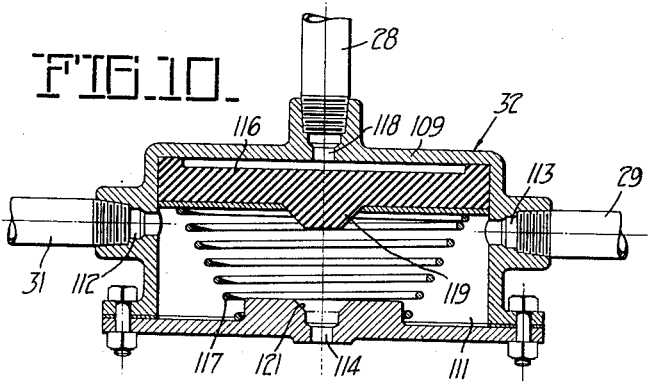
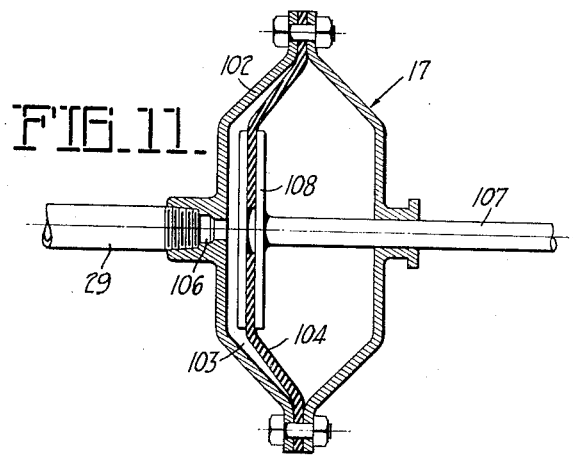
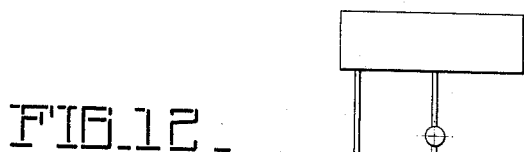
INVENTOR.
Raymond E. Cox
BY
ATTORNEY.

Patented Sept. 6, 1938

2,128,916

UNITED STATES PATENT OFFICE 2,128,916

AUTOMOTIVE CONTROL SYSTEM

Raymond E. Cox, Oakland, Calif., assignor of one-half to Walter N. Basham, Oakland, Calif.

Application February 9, 1938, Serial No. 189,697

7 Claims. (Cl. 188—110)

The invention relates to automotive control systems of the type operated from an automotive steering mechanism and functioning incident to a release of the steering mechanism by the operator to prevent operation of the vehicle, or if the same is in motion, to bring the vehicle to a stop. The present application is a continuation-in-part of my co-pending application, Serial No. 104,805, filed October 9, 1936 for Automotive control system.

Such systems have heretofore contemplated the use of an electric switch means on the steering wheel of the automobile, which was actuated upon the normal grasping of the wheel by the operator and which operated through an electric circuit to actuate the braking mechanism of the automobile. In most instances, however, that I am acquainted with, the construction of the switch means on the steering wheel was such that the same could be readily operated in a manner other than the grasping of the wheel, such as the movement of substantially any portion of the operator's body into contact with the steering wheel. Inasmuch as one of the important features of this type of control is to bring the automobile to a stop should the operator, for some reason, lapse into unconsciousness, it is important that a slumping of the operator's body against the wheel will not produce the same effect on the control as the normal gripping of the wheel by the operator. Also, the previous systems with which I am acquainted, have not provided for a sufficient latitude of operation to make the same practical since such systems have required the operator to constantly maintain his hands on the steering wheel, or at certain parts thereof, even though under certain operating conditions it is desirable, or at such times, necessary for the operator to momentarily release his grip on the steering wheel. In accordance with the present invention and as a principal object thereof, I have provided an automotive control system of the character described, which will protect against any accidental operation of the control by a falling or slumping of part of the operator's body against the steering wheel and which will in the normal operation thereof positively bring the motor vehicle to an almost immediate stop upon the operator losing consciousness.

Another object of the invention is to provide a control system of the character described which will be particularly adaptable to buses, stages, or other forms of passenger carrying vehicles and which will automatically hold the vehicle against movement when the same has been brought to a stop for the purpose of taking on or discharging passengers and during a period when the operator's hands and mind are occupied with the passing out and receipt of change and transfers, etc., and thereby relieve the operator of one of his most important responsibilities of holding the vehicle absolutely motionless during the taking on and discharge of passengers.

A further object of the invention is to provide a control system of the character described which will permit the operator to release the steering wheel momentarily when the same is desirable or necessary without causing an immediate or abrupt stopping of the vehicle.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to said drawings:

Figure 1 is a diagrammatic representation of an automotive control system of the present invention.

Figure 2 is a plan view, partly in section, of an automotive steering wheel constructed in accordance with the present invention.

Figure 3 is a fragmentary cross-sectional view of the steering wheel illustrated in Figure 1 and is taken substantially on the plane of line 3—3 of Figure 1.

Figure 4 is an enlarged plan sectional view of a part of the steering wheel.

Figure 10 is a cross-sectional view of a quick release pressure valve used in the control system.

Figure 11 is a cross-sectional view of one of the brake actuating means used in the control system.

Figure 12 is a diagrammatic representation of a modified form of the automotive control system.

Figure 6:
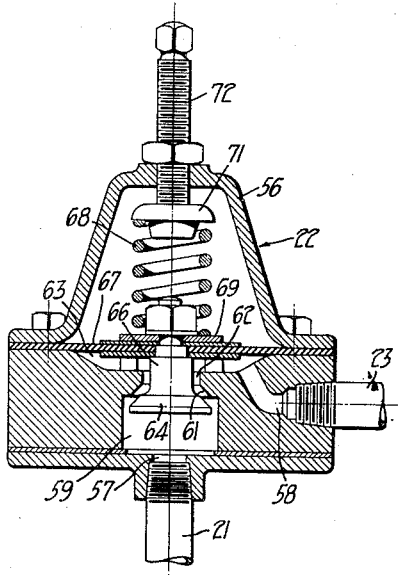
Figure 6 is a cross-sectional view of a pressure reduction valve used in the control system.

The automotive control system of the present invention, and as illustrated in the accompanying drawings, comprises an automotive steering wheel 6 which is provided with an electric switch means 7 adapted to be actuated upon grasping of the wheel and which is connected in a series electric circuit across the battery 8 and the automotive ignition switch 9 in parallel with the ignition circuit of the automobile engine energized by conductors 25 and 30. In addition to the steering wheel 7 there is included in the first circuit a manually controlled switch 11, a fuse 12 and an electrically operated fluid control valve 13. The latter is connected in a fluid circuit adapted for operating the vehicle brake mechanisms 14, 16, 17 and 18, the mechanisms 14 and 16 being here associated with the front and steerable wheels of the vehicle and the mechanisms 17 and 18 being associated with the rear wheels of the vehicle. A storage tank 19 of fluid under pressure is connected by way of a conduit 21 to a fluid pressure reduction valve 22 and thence by conduits 23 to the electrically operated fluid control valve 13. From the valve 13 the fluid passes by way of conduit 24 to a triple or double check valve 26 which is in turn connected by conduits 27 and 28 to the front and rear brake mechanisms 14, 16, 17 and 18. Mounted in conduit 28 at the juncture thereof with conduits 29 and 31 leading to the rear brake mechanisms 17 and 18 is a quick release valve 32 which operates to release the pressure in the brake mechanisms upon release of pressure in the control lines, as will be more fully hereinafter pointed out. Connected in parallel with the aforesaid fluid control circuit including conduits 21, 23, 24, 27 and 28 is a fluid control circuit adapted for manual operation and which includes a conduit 33 leading from the storage tank 19 to a foot control fluid valve 34 and a conduit 36 leading from the control valve 34 to the conduit 27.

In accordance with the above described arrangement, it is provided that upon closing of the electric switches 7, 9 and 11, the fluid valve 13 will be open and the pressure source communicated with the brake mechanisms to prevent movement of the vehicle or if the same be in motion, to bring the vehicle to a stop. As above indicated, the switch 9 is preferably common to both the control system and the ignition circuit of the vehicle and consequently with the motor turned off by the opening of the ignition circuit, the control system will be automatically taken out of operation. Conversely, when the ignition circuit is closed, the control system will be placed in readiness for operation. Both switches 7 and 11 are designed to be normally held in closed position so that upon closing of the ignition circuit of the engine, the brakes will be automatically set unless the operator opens the electric circuit by opening side switch 7 at the steering wheel or manually controlled switch 11.

Figure 5:
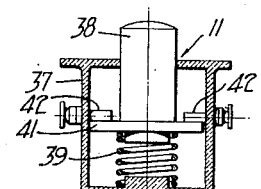
Figure 5 is a cross-sectional view of a manually controlled electric switch used in the control system.

Switch 11 as aforesaid, is of a manually controlled type and is preferably mounted at a convenient location in the driver's compartment of the vehicle to enable the operator to open the switch when desired and under certain conditions, when his hands are momentarily withdrawn from the steering wheel. Preferably, the switch is mounted on the floor of the driver's compartment in a more or less out of the way position, so that the same may be readily engaged and opened by the operator's foot, but will not normally be engaged by the operator, especially should the latter lapse into unconsciousness. A suitable switch for use in the present control system has been illustrated in Figure 5 of the drawings. The switch here shown comprises a casing 37 which carries a reciprocating plunger 38 normally held by spring 39 within the casing in a position engaging a contact bar 41 carried thereby with stationary contacts 42 mounted in the casing. The electric circuit is connected with contacts 42 so that normally the switch is held in closed position by the spring 39. The switch may be opened by pressing the plunger 38 into the casing 37 so as to disengage contact bar 41 with contacts 42.

One of the principal features of the present invention is its effectiveness in bringing the vehicle to a substantially momentary stop should the operator of the vehicle for some reason, lapse into unconsciousness and release his grip on the steering wheel. Such operation follows from the foregoing by a closing of the switch 7 at the steering wheel. In the present embodiment the switch is incorporated on the steering wheel in such a way that its normal operation will not be interfered with by the accidental movement of the body of the operator against the wheel. As here shown, in Figures 2, 3 and 4, the steering wheel is composed of a plurality of radially movable segmental sections 43 which are slidably carried in grooves 44 provided at the inner periphery of the steering wheel and which are normally held in radially inward position by means of light helical springs 46 connected adjacent the ends of the sections of the steering wheel. Provided at the ends of the sections are contact members 47, which in the inner position of the sections, are engaged with electric contact members 48 carried by the wheel. The contact members at the ends of each of the sections are electrically connected by conductor 49 extending around the outer periphery of the sections and the adjacent contact members 48 are preferably formed with an electric interconnecting portion 51 whereby in normal inner displaced position of the sections, a complete electric circuit will be made around the periphery of the wheel. The electric connection of the several contact members is provided by way of a pair of conductors 52 which are carried in one of a set of radial braces 53 of the wheel and are connected to a pair of contact members 48 between which the inter-connecting portion 51 has been deleted.

As will be understood, the positioning of the segments 43 at the inner periphery of the steering wheel prevents an opening of the switch 7 by reason of an accidental movement of the operator's body against the top, bottom or outer periphery of the steering wheel. This is of considerable importance, since a driver lapsing into unconsciousness may likely slump onto the steering wheel or into a position bringing his arms or other part of his body against the under side of the steering wheel. To prevent the insertion of an arm or other part of the body into the center of the steering wheel and thereby rendering likely the displacement of one of the sections 43, I position within the enclosure defined by the wheel a circular guard 54 which is spaced a short distance from the sections 43 and which may be conveniently fastened to the radial braces 53.

In order to prevent a too abrupt stopping of the vehicle upon opening of the switch 7, the fluid pressure reduction valve 22 is used in order to reduce the normally high fluid pressure in the container 19, for application to the brake mechanisms. Normally, in stopping the vehicle by use of the foot control valve, the pressure applied to the brakes is under the control of the operator by the use of the foot control valve as hereinafter more fully set forth, and normally only a part of the available pressure is used. A suitable pressure reduction valve has been illustrated in Figure 6 of the drawings and the valve there illustrated comprises a valve casing 56 having an inlet passage 57 to which the conduit 21 is connected and a discharge passage 58 to which the conduit 23 is connected. The inlet passage 57 opens into a valve chamber 59 which is provided at an opposite end with a valve seat 61 and a passage 62 opening into a chamber 63 to which the discharge passage 58 is connected. Mounted in the chamber 59 for movement to and from the seat 61 is a valve 64 having a stem 66 passing through the passage 62 and secured to a diaphragm 67 mounted across the base of the chamber 63. The valve is normally held in partially open position by means of a spring 68 compressed between a supporting plate 69 on the diaphragm and a spring seat 71 on the inner end of a screw 72 threaded through the casing on the top of the chamber 63. The purpose of the above arrangement is to open and close the valve 64 in accordance with any fluctuations in the pressure in the intake passage 57 to produce a substantially constant and reduced output pressure at the passage 58. An increase of pressure in the valve chamber 59 will cause a lifting of the diaphragm 67 and a raising of the valve 64 towards the seat 61 to decrease the passage area and reduce the pressure to a predetermined value. Conversely, upon a decrease of pressure in the chamber 59, the spring 68 will press the diaphragm downward and will cause a further opening of the valve 64. The reduced output pressure may be controlled by adjustment of the screw 72 so as to increase or decrease the tension of spring 68.

Figure 7:
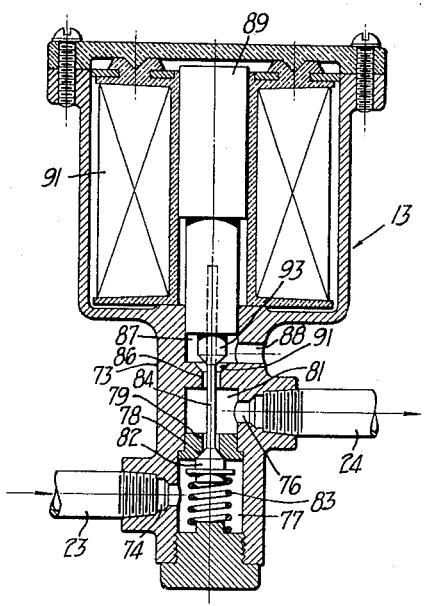
Figure 7 is a cross-sectional view of a magnetic operated fluid valve used in the control system.

The function of the electrically operated fluid control valve 13, as indicated above, is to normally close the fluid circuit through conduits 23 and 24, but to open this circuit upon closing of the electric circuit connected thereto. This valve may be of a magnetic solenoid type, such as illustrated in Figure 7, comprising a casing 73 having an intake passage 74, to which the conduit 23 is connected and a discharge passage 76, to which the conduit 24 is connected. Passage 74 opens into a valve chamber 77, which is provided at its upper end with a valve seat 78 and an opening 79 therethrough into a discharge chamber 81, to which the passage 76 is connected. Mounted in the chamber 77 is a valve 82 which normally is held by means of a spring 83 against the valve seat 78 and is provided with a stem 84 which extends through opening 79 and discharge chamber 81 and through an opening 86 above the discharge chamber connecting the latter with a chamber 87 vented to the atmosphere by port 88. The stem 84 is connected at its upper end to a magnetic plunger 89, whose movement is controlled by magnetic flux established by an electric coil 91 wound around the plunger. The base of the chamber 87 is formed with a valve seat 91 surrounding the opening 86 and the lower end 93 of the plunger is faced for engagement with said seat upon actuation of the plunger by the energized coil to close off passage 86 and communication of discharge chamber 81 with the atmosphere. The lowering of the plunger by a lowering of the valve 82 which communicates the intake and discharge passages 74 and 76 for passage of fluid through the valve. On de-energizing of the coil 91 the plunger and valve 82 are returned to their former position, as illustrated in Figure 7, and the pressure in the discharge line 24 is relieved through the atmospheric port 88.

Figure 8:
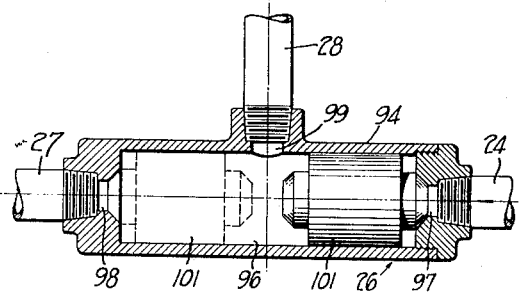
Figure 8 is a cross-sectional view of a triple or double check fluid valve used in the control system.

Preferably, the automatic operation of the brakes by the present control system is applicable to the rear brakes of the vehicle only, so as to bring the vehicle to a stop with a minimum change in direction of the vehicle movement, notwithstanding a lack of control of the direction of movement of the vehicle by the operator. To accomplish this application of the pressure to the rear brakes only, I provide at the juncture of the conduits 24, 27 and 28, a so-called "triple" or double-check valve 26 mentioned in the foregoing. Such a valve is illustrated in Figure 8 and consists of a casing 94 having a cylindrical center chamber 96 with passages 97 and 98 at the ends of the cylinder and a passage 99 at an intermediate part of the length of the cylinder. In the present arrangement, conduit 24 from the valve 13 is connected to passage 97, conduit 27 leading to the front brake mechanisms is connected to passage 98 and conduit 28 leading to the rear brake mechanisms is connected to passage 99. Mounted for reciprocation within the cylinder 96 is a piston type valve 101 which is adapted for movement longitudinally in the cylinder to seal off either the passage 97 or 98, depending upon the pressure differentials in the passages. Upon application of pressure at passage 97, as caused by opening of the valve 13, the piston valve 101 will slide to the left with reference to Figure 8, to a position indicated in dotted lines in said figure, so as to close off passage 98 and cause communication of passages 97 and 99. In this manner, fluid under pressure entering passage 97, will flow only to passage 99 and thence to the rear brake mechanisms. Upon opening of the foot control valve, however, fluid under pressure flows to both the front and rear brakes. In this case, the fluid under pressure enters the triple valve by way of passage 98 and thereby displaces the piston 101 to the right, as shown in Figure 8, to communicate passages 98 and 99 so as to connect conduits 28 and 27 leading to the rear and front brake mechanisms.

The brake actuating mechanisms 14, 16, 17 and 18 may be of any standard form, such as the one illustrated in Figure 11. As here shown, the mechanism comprises a casing 102 providing an interior chamber 103, which is divided by a diaphragm 104. Fluid pressure is communicated into the chamber at one side of the diaphragm through passage 106 to which, in the present showing, conduit 29 is connected. A push rod 107 is connected by means of a backing plate 108 to the opposite side of the diaphragm and extends through the casing 102 for actuation of the brake proper.

Preferably, there is incorporated in the conduits leading to the brake mechanisms 14, 16, 17 and 18, a quick release valve 32, as indicated in the foregoing, for releasing the pressure applied to the brake mechanisms upon release of the pressure at the electrically operated valve 13 or the foot control valve 34. Such a quick release valve is illustrated in Figure 10 and comprises a casing 109 having an interior valve chamber 111 of cylindrical form and provided with outlet passages 112 and 113 positioned along the sides of the chamber and to which the conduits 31 and 29 respectively leading to the brake mechanisms 18 and 17 are connected. The chamber is normally vented to the atmosphere by a port 114 in an end wall of the casing. Mounted for reciprocation within the chamber is a piston type valve 116 which is normally held above the passages 112 and 113 by means of a spring 117 and which is displaced upon application of pressure through an inlet passage 118 in the opposite end of the chamber and to which passage the conduit 28 is connected. The under side of the valve 116 is provided with tapered plug portion 119, which is adapted to seat on a valve seat 121 provided around the opening 114 in the chamber, so that upon application of pressure the valve 116 will be displaced longitudinally through the chamber, so as to communicate passage 118 with passages 112 and 113 and at the same time, seal off the passage 114 to the atmosphere. Upon release of pressure in the conduit 28, the valve will be pressed to its upward position, as shown in Figure 10, so as to uncover the atmospheric port and to communicate passages 112 and 113 therewith for venting the brake lines 29 and 31.

Figure 9:
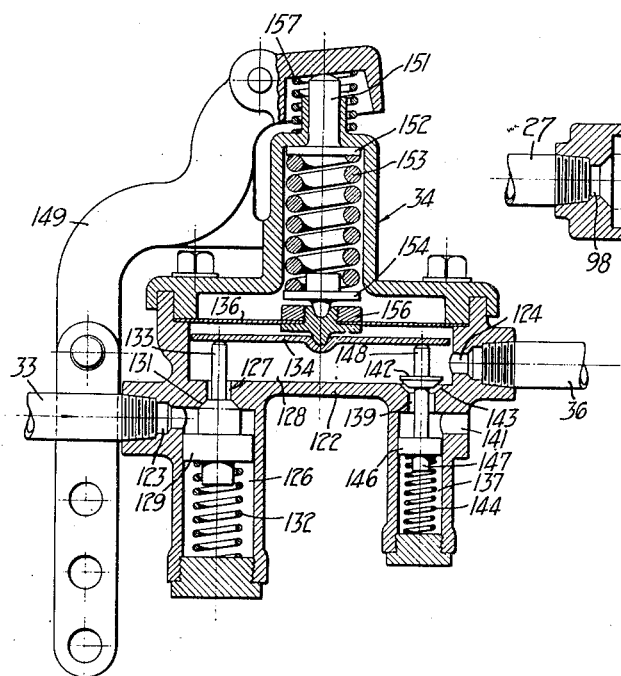
Figure 9 is a foot control fluid valve used in the control system.

The foot control valve 34 of the present system may be constructed, as illustrated in Figure 9. As here shown, the valve comprises a casing 122 having inlet and discharge passages 123 and 124, to which the conduits 33 and 36 are connected. The passage 123 opens into the top of a valve chamber 126 and is communicated through the top wall of the chamber by way of opening 127 with an enlarged pressure chamber 128 with which the passage 124 registers. A reciprocal type valve 129 mounted in the chamber 126 controls the flow of fluid from passage 123 into chamber 128 and, as here shown, normally engages with a valve seat 131 surrounding the opening 127 at the under side of the top wall of the chamber by means of helical spring 132 compressed between the under side of the valve and the base of the chamber. The valve is provided with a stem 133 which extends upwardly through the opening 127 into engagement with the under side of a swivel plate 134, which is fulcrumed adjacent the center thereof to the under side of a pressure responsive diaphragm 136 mounted across the chamber 128 adjacent the top thereof. Means are provided for venting the chamber 128 and the discharge conduit 36 to the atmosphere upon closing of valve 129 and, as here shown, such means consists of a second valve chamber 137 communicated with chamber 128 by way of opening 139 and communicated with the atmosphere by way of port 141. A valve 142 in chamber 128 is arranged to engage valve seat 143 provided about the opening 139 at the base of chamber 128 and is normally held out of engagement with such seat by means of a helical spring 144 compressed between a spring seat 146 provided on a stem 147 of the valve and the base of the chamber 137. The upper end 148 of the stem 147 is arranged to engage the under side of the swivel plate 134 at the opposite side of its fulcrum from the valve stem 133. In order to provide for a seating of valve 142 prior to an opening of valve 131 so that chamber 128 will be shut off from the atmosphere upon application of pressure therein, spring 144 is constructed somewhat lighter than spring 132, so that depression of the swivel plate 134 at its fulcrum point will cause a rocking of the plate to close valve 142 before depression and opening of valve 131. It will also be noted that after valve 131 has been opened, the pressure in chamber 128 will assist in maintaining the valve 142 seated. Displacement of the plate 134 to so actuate the valves is here effected by means of a manually controlled lever 149 which is pivoted to the casing 122 and is engageable with the upper end of a stem 151 of a spring rest 152 bearing against the upper end of a helical spring 153 supported at its lower end on a spring rest 154, fulcrumed on a supporting plate 156 on the diaphragm 136. The lever 149 is normally held to release any downward force on the stem 151 by a helical spring 157 mounted between the actuating end of the lever and the body of the casing. From the foregoing, it will be clear that upon release of lever 149 to return the swivel plate 134 to normal position, as illustrated in Figure 9, the valve 131 will first close due to the greater force of spring 132, and after closing of valve 131 and further retraction of plate 134, spring 144 will cause an upward movement of valve 142 so as to vent chamber 128 and brake line 36 to the atmosphere. The release of pressure in the conduit 36 causes a release of pressure in the brake mechanisms by means of quick release valve 32 hereinabove referred to.

A slightly modified form of the invention has been illustrated in Figure 12, wherein the front brakes as well as the rear brakes are actuated upon a closing of the electric control circuit. This is effected by changing the hook-up of the triple valve 26' by connecting conduit 36' from the foot control valve 34' to one end of the triple valve at passage 98 (see Figure 8) and connecting the center passage 99 by way of conduit 158 to a conduit 159 connected to both the front and rear brake mechanisms. The conduit 24' from the electrically operated valve 13', is connected to the opposite end of the triple valve passage 97 as in the first embodiment. In accordance with this connection and as will be clear with reference to Figure 8, upon application of fluid under pressure from foot control valve 34', the piston 101 of the triple valve will be caused to move to the right to thereby communicate passages 98 and 99 which causes the flow of fluid through conduit 158 to the brake mechanisms. On the other hand, upon application of fluid under pressure, from the electric control valve 13' by way of conduit 24' to passage 97 of the triple valve, the piston valve 101 will be moved to the left as indicated in dotted lines in Figure 8 to communicate passages 97 and 99 and cause the flow of fluid under pressure from the conduit 24' to conduit 158 and thence by way of conduit 159 to both the front and rear brake mechanisms.

From the foregoing, it is believed that the operation of the system will be understood. Initially the operator will close the ignition switch 9 to start the operation of the vehicle motor and before he may proceed, it is necessary that he either grip the steering wheel so as to open the electric circuit at one of the contact members 47 and 48, or that he manually displace the switch 11 so as to open the control circuit and release the brakes. As aforementioned, the switch 11 is preferably located at a position in the driver's compartment where the same will not ordinarily be used by the operator and consequently it is practically necessary that the operator have his hands on the steering wheel during movement of the vehicle. However, during such movement and under certain circumstances where desirable or necessary, the operator may, by opening the switch 11, momentarily release the steering wheel. After the vehicle has been brought to a stop in the usual manner for taking on or discharging of passengers, the operator may release the steering wheel so as to effectively use both of his hands in making change, receiving fares, passing out transfers, etc., and by reason of his release of the steering wheel, the vehicle will be positively held against movement and the incoming and departing passengers thereby safeguarded. In addition and as hereinabove explained, should the driver of the vehicle during operation thereof lapse into unconsciousness by reason of sleepiness, death or the like, the vehicle will be promptly brought to a stop upon the driver releasing his grip on the steering wheel, notwithstanding the fact that the driver may by reason of his unconsciousness, slump against or fall upon the steering wheel. It will further be noted that the provision of the present automatic control system in nowise interferes with the usual operation of the brakes by means of the foot control valve 34.

I claim:

1. An automotive control system comprising, a steering wheel, an electric switch mounted at the inner periphery of said wheel and adapted to be held in open position when said wheel is grasped by the operator, an electrically controlled fluid valve connected to said switch and being closed and open in the open and closed positions respectively of said switch, and fluid pressure operated brake means connected with said valve.

2. An automotive control system comprising, a steering wheel having fixed and radially movable sections arranged with said movable sections at the inner periphery of the wheel, engageable electric contact means on said sections, means normally positioning said sections for engagement of said contact means, said movable sections being positioned for grasping jointly with the steering wheel by the operator for disconnecting said contact means, an electrically controlled fluid valve connected in an electric circuit with said contact means and movable to open position on engagement of said contact means, and fluid pressure operated brake means connected to said valve and operative in the open position of said valve.

3. An automotive control system comprising, a steering wheel having a radially movable section adapted to be gripped by the operator together with said wheel for radial displacement thereon, engageable electric contacts on said wheel and section, means resiliently holding said section in position engaging said contacts, said section being movable by the operator on gripping the wheel against the resistance of said resilient means to separate said contacts, a guard carried by said wheel in spaced relation to said section for preventing accidental engagement thereof by the body of the operator, an electrically controlled fluid valve connected to said contacts and moved to open and closed position upon engagement and disengagement respectively of said contacts, and fluid pressure operated brake means connected with said valve and being operative in the open position of said valve.

4. In combination with an automobile having wheels with fixed axes of rotation and steerable wheels and fluid pressure operated brake means connected to said wheels and a source of fluid pressure and a manually controlled means of communication of said source with said brake means, an auxiliary safety control system comprising, a steering wheel, electric switch means on said steering wheel and normally positioned in closed position and adapted for actuation on grasping of said wheel for movement to open position, an electrically controlled fluid valve connected with a source of electric potential and said switch and moved to an open and closed position upon closing and opening respectively of said switch, fluid passage means connecting said source and valve to said brake means, and a check valve in said passage means affording an actuation of brake means at said first named wheels only by said auxiliary safety control system.

5. In a safety control system of the character described for an automobile having a source of electric potential and an ignition circuit and ignition switch, a steering wheel, an electric switch mounted on said wheel and normally positioned in closed position and engageable by the operator upon gripping of the wheel to move and hold the switch in open position, an electrically controlled fluid valve connected electrically in series relation with said last named switch and said ignition switch and said source of potential and operative to close and open upon opening and closing respectively of said circuit, a source of fluid under pressure, fluid pressure operated brake means for said automobile, and fluid passage means connecting said pressure source and said valve and said brake means for causing the operation of said brake means incident to opening of said valve.

6. In a safety control system of the character described for an automotive vehicle having a source of fluid pressure and fluid pressure brakes operated from said source, a steering wheel, a self closing electric switch mounted on said wheel and engageable by the operator in gripping the wheel to move and hold said switch in open position, an electrically controlled fluid valve connected in series relation with said switch and a source of electrical potential and movable to closed and open position upon opening and closing said switch, a second self closing electric switch connected in said circuit for operation by the operator to open said circuit upon release of said steering wheel, and fluid passage means connecting said source of fluid pressure to said valve and from said valve to said brake means for causing the operation of said brake means upon the opening of said valve.

7. An automobile control system comprising, a steering wheel, an electric switch mounted at the inner periphery of said wheel and comprising a radially movable member and adapted to be held in open position when said wheel is grasped by the operator, an electrically controlled fluid valve connected to said switch and being closed and opened in the open and closed position respectively of said switch, fluid pressure operated brake means connected to said valve, and a guard carried by said wheel in inwardly spaced relation to said switch member for preventing accidental engagement thereof by the operator.

RAYMOND E. COX.